US010471369B2

(12) United States Patent
Hammon et al.

(10) Patent No.: US 10,471,369 B2
(45) Date of Patent: Nov. 12, 2019

(54) CHIMNEY TRAY FOR A COLUMN FOR THERMAL TREATMENT OF FLUID MIXTURES

(71) Applicant: BASF SE, Ludwigshafen am Rhein (DE)

(72) Inventors: Ulrich Hammon, Mannheim (DE); Thomas Walter, Hassloch (DE)

(73) Assignee: BASF SE, Ludwigshafen am Rhein (DE)

( * ) Notice: Subject to any disclaimer, the term of this patent is extended or adjusted under 35 U.S.C. 154(b) by 140 days.

(21) Appl. No.: 15/382,036

(22) Filed: Dec. 16, 2016

(65) Prior Publication Data

US 2017/0173491 A1 Jun. 22, 2017

Related U.S. Application Data

(60) Provisional application No. 62/269,124, filed on Dec. 18, 2015.

(30) Foreign Application Priority Data

Dec. 18, 2015 (DE) .................. 10 2015 122 232

(51) Int. Cl.
*B01D 3/32* (2006.01)
*B01D 3/20* (2006.01)
*B01F 3/04* (2006.01)

(52) U.S. Cl.
CPC .............. *B01D 3/324* (2013.01); *B01D 3/20* (2013.01); *B01D 3/205* (2013.01); *B01F 3/04078* (2013.01); *B01F 3/04496* (2013.01)

(58) Field of Classification Search
CPC .......... B01D 3/324; B01D 3/20; B01D 3/205; B01F 3/04078; B01F 3/04496
See application file for complete search history.

(56) References Cited

U.S. PATENT DOCUMENTS

| 1,821,619 | A | * | 9/1931 | Day | ................... B01D 3/205 202/158 |
| 2,600,710 | A | * | 6/1952 | Wade | ................... B01D 3/205 261/114.2 |

(Continued)

FOREIGN PATENT DOCUMENTS

| DE | 936 032 | 12/1955 |
| DE | 199 24 532 A1 | 11/2000 |

(Continued)

OTHER PUBLICATIONS

U.S. Appl. No. 15/382,073, filed Dec. 16, 2016, Ulrich Hammon, et al.

(Continued)

*Primary Examiner* — Stephen Hobson
(74) *Attorney, Agent, or Firm* — Oblon, McClelland, Maier & Neustadt, L.L.P.

(57) ABSTRACT

The present invention relates to a chimney tray (3) for a column (1) for thermal treatment of fluid mixtures, comprising a collecting tray (4) and at least two chimneys (5-1, 5-2) spaced apart horizontally in the collecting tray (4), where each chimney (5-1, 5-2) forms a vertically aligned chimney body (6-1, 6-2) which forms a passage orifice (7-1, 7-2) through the collecting tray (4), and has a cover unit (8-1, 8-2) arranged spaced apart from the chimney body (6-1, 6-2), and where the cover unit (8-1, 8-2) covers the respective passage orifices (7-1, 7-2) in the vertical direction. The chimney tray (3) of the invention is characterized by a screen (9) which extends around the chimney body (6-1) of a first chimney (5-1), with the lower annular edge (14) of the screen (9) below the upper edge (13) of the chimney body (6-1) of the first chimney (5-1) and the upper annular edge (11) of the screen (9) above the lower outer edge (12) of the cover unit (8-1) of the first chimney (5-1)

(Continued)

or adjoining the lower outer edge (12) of the cover unit (8-1) of the first chimney (5-1).

16 Claims, 5 Drawing Sheets

(56) References Cited

U.S. PATENT DOCUMENTS

| | | | |
|---|---|---|---|
| 3,988,213 | A | 10/1976 | Yoshida et al. |
| 4,933,047 | A * | 6/1990 | Bannon .................... B01D 3/20 196/136 |
| 7,234,692 | B2 * | 6/2007 | Dichtl .................... B01D 3/008 261/114.2 |
| 8,083,901 | B2 * | 12/2011 | Sharma ................ B01D 1/305 202/158 |
| 9,403,103 | B2 * | 8/2016 | Giese .................... B01D 3/163 |
| 9,499,969 | B2 | 11/2016 | Ulrich |
| 2001/0007043 | A1 | 7/2001 | Machhammer et al. |
| 2002/0043454 | A1 | 4/2002 | Machhammer et al. |
| 2004/0073063 | A1 | 4/2004 | Thiel et al. |
| 2004/0097756 | A1 * | 5/2004 | Thiel .................... B01D 3/20 562/600 |
| 2004/0130041 | A1 | 7/2004 | Resetarits ................ B01D 3/20 261/79.2 |
| 2005/0023125 | A1 * | 2/2005 | Hammon ................ B01D 3/24 202/158 |
| 2005/0211542 | A1 * | 9/2005 | Hammon ................ B01D 3/22 203/63 |
| 2008/0183014 | A1 | 7/2008 | Diefenbacher et al. |
| 2010/0221156 | A1 * | 9/2010 | Maleta .................... B01D 3/163 422/607 |
| 2013/0113128 | A1 * | 5/2013 | Alzner .................... B01D 3/22 261/158 |
| 2013/0125751 | A1 * | 5/2013 | Matten ............... B01D 53/1475 95/156 |
| 2017/0340985 | A1 * | 11/2017 | Zhang .................... B01D 3/14 |

FOREIGN PATENT DOCUMENTS

| | | |
|---|---|---|
| DE | 199 24 533 A1 | 11/2000 |
| DE | 101 59 825 A1 | 6/2003 |
| DE | 102 18 419 A1 | 6/2003 |
| DE | 102 30 219 A1 | 1/2004 |
| DE | 103 36 386 A1 | 3/2004 |
| DE | 102 43 625 A1 | 4/2004 |
| DE | 103 32 758 A1 | 5/2004 |
| DE | 10 2009 029 771 A1 | 12/2010 |
| DE | 10 2010 001 228 A1 | 2/2011 |
| EP | 0 982 289 A2 | 1/2000 |
| EP | 0 982 287 A1 | 3/2000 |
| EP | 1 029 573 A2 | 8/2000 |
| EP | 1 125 912 A2 | 8/2001 |
| EP | 1 279 429 A1 | 1/2003 |
| GB | 751215 | 6/1956 |
| WO | WO 2004/035514 A1 | 4/2004 |
| WO | WO 2008/090190 A1 | 7/2008 |

OTHER PUBLICATIONS

U.S. Appl. No. 14/817,351, filed Aug. 4, 2015, US 2016-0040929 A1, Feb. 2016, Ulrich Hammon, et al.
U.S. Appl. No. 14/816,485, filed Aug. 3, 2015, US 2016-0038852 A1, Feb. 2016, Ulrich Hammon, et al.
U.S. Appl. No. 14/573,313, filed Dec. 17, 2014, US 2015-0166455 A1, Jun. 2015, Ulrich Hammon, et al.
U.S. Appl. No. 14/857,998, filed Sep. 18, 2015, US 2016-0083267 A1, Mar. 2016, Ulrich Hammon, et al.
U.S. Appl. No. 14/661,408, filed Mar. 18, 2015, US 2015-0267967 A1, Sep. 2015, Ulrich Hammon, et al.
U.S. Appl. No. 14/738,033, filed Jun. 12, 2015, US 2015-0360142 A1, Dec. 2015, Ulrich Hammon, et al.
U.S. Appl. No. 14/738,050, filed Jun. 12, 2015, US 2016-0010850 A1, Jan. 2016, Ulrich Hammon, et al.
U.S. Appl. No. 14/737,025, filed Jun. 11, 2015, US 2015-0360191 A1, Dec. 2015, Ulrich Hammon, et al.
U.S. Appl. No. 14/857,967, filed Sep. 18, 2015, US 2016-0090347 A1, Mar. 2016, Ulrich Hammon, et al.
U.S. Appl. No. 14/659,753, filed Mar. 17, 2015, US 2015-0266000 A1, Sep. 2015, Ulrich Hammon, et al.
U.S. Appl. No. 14/633,433, filed Feb. 27, 2015, US 2015-0246343 A1, Sep. 2015, Ulrich Hammon, et al.
U.S. Appl. No. 15/072,463, filed Mar. 17, 2016, US 2016-0271516 A1, Sep. 2016, Tim Blaschke, et al.

* cited by examiner

CHIMNEY TRAY FOR A COLUMN FOR THERMAL TREATMENT OF FLUID MIXTURES

The present invention relates to a chimney tray for a column for thermal treatment of fluid mixtures, in particular for thermal treatment of polymerizable fluid mixtures, and to a column with a chimney tray of the invention being arranged in the column body. The chimney tray comprises a collecting tray and at least two chimneys spaced apart horizontally in the collecting tray. Each chimney has a vertically aligned chimney body which forms a passage orifice through the collecting tray. The chimney body is especially cylindrical. In addition, each chimney has a cover unit arranged spaced apart from the chimney body. This cover unit covers the respective passage orifice in the vertical direction.

Chimney trays are used in separation columns. In such separation columns, gaseous (ascending) and liquid (descending) streams are frequently conducted in countercurrent, at least one of said streams especially comprising a polymerizable compound, in particular a (meth)acrylic monomer. As a result of the inequilibria that exist between the streams, heat and mass transfer takes place, which ultimately results in the removal (or separation) desired in the separation column. In this document, such separation processes shall be referred to as thermal separation processes.

Examples of such thermal separation processes are fractional condensation (cf., for example, DE 19924532 A1, DE 10243625 A1 and WO 2008/090190 A1) and rectification. In these two processes, an ascending vapor phase is conducted in countercurrent to a descending liquid phase. The separating action is based on the vapor composition at equilibrium being different from the liquid composition. A further thermal separation process is absorption, in which at least one ascending gas is conducted in countercurrent to at least one descending liquid. The separating action is based on the different solubility of the gas constituents in the liquid. Yet a further thermal separation process is desorption. This is the reverse process of absorption. This removes the gas dissolved in the liquid phase by lowering the partial pressure. When the partial pressure of the material dissolved in the liquid phase is lowered at least partly by passing a carrier gas through the liquid phase, this thermal separation process is also referred to as stripping. Alternatively or else additionally (simultaneously as a combination), the lowering of the partial pressure can also be brought about by lowering the working pressure.

For example, the removal of (meth)acrylic acid and/or (meth)acrolein from the product gas mixture of the catalytic gas phase oxidation can be conducted in such a way that the (meth)acrylic acid and/or the (meth)acrolein is first subjected to basic removal by absorption into a solvent (e.g. water or an organic solvent) or by fractional condensation of the product gas mixture, and the absorbate or condensate obtained is subsequently separated further to obtain (meth) acrylic acid and/or (meth)acrolein of greater or lesser purity (cf., for example, DE-10332758 A1, DE 10243625 A1, WO 2008/090190 A1, DE 10336386 A1, DE 19924532 A1, DE 19924533 A1, DE 102010001228 A1, WO 2004/035514 A1, EP 1125912 A2, EP 982289 A2, EP 982287 A1 and DE 10218419 A1).

Separation columns in which this separation processes are conducted comprise mass transfer trays as separating internals. Mass transfer trays used are especially trickle sieve trays. A trickle sieve tray is a plate, or plate segments joined to form a plate, having essentially planar passage orifices, for example round holes and/or slots, for the ascending gas or vapor phase (the terms "gaseous" and "vaporous" are used synonymously in this document) distributed over the plate (cf., for example, DE 10230219 A1, EP 1279429 A1, U.S. Pat. No. 3,988,213 and EP 1029573 A1). Any orifices beyond these (for example at least one downcomer (at least one drain segment)) are generally not present in trickle sieve trays. As a result of this absence of downcomers, both the gas ascending within the separating column (the vapor ascending within the separating column) and the liquid descending within the separating column have to move, flowing in opposite directions, alternating in time, through the (same) passage orifices (through the open cross sections of the passages). Reference is also made to the "dual flow" of ascending gas and descending liquid through the passage orifices, which is the reason why the literature frequently also uses the term "dual-flow trays" for mass transfer trays of this type.

Chimney trays are trays having forced liquid conduction. In this case, as well as the passage orifices already described, at least one downcomer is additionally provided. The latter is, for example, at least one drain orifice, toward which the liquid that has descended on the chimney tray flows, and which runs into a shaft which leads to the mass transfer tray beneath in the sequence and which generally has a centrally symmetric configuration with respect to an axis pointing in the longitudinal direction of the column. The cross section of the shaft may vary (for example narrow) along this axis or else be constant.

By virtue of the at least one downcomer of the chimney tray, within a sequence of trays, it is possible for the liquid descending from a higher chimney tray, irrespective of the gas or vapor rising as before through the passage orifices of this chimney tray, to descend as at least one feed of liquid to the next tray down in the sequence.

The chimneys of the chimney trays in this case form the passage orifices for the ascending vapor or the ascending gas. At the same time, the chimneys, by means of cover units such as covering hoods, prevent the liquid dripping downward from passing downward through the passage orifices of the chimneys. The liquid dripping downward is instead collected on the chimney tray and runs downward through the downcomer separately from the ascending vapor or gas. Such a chimney tray is described, for example, in DE 101 59 825 A1.

In the case of a chimney tray having a plurality of chimneys arranged alongside one another, however, the problem arises that liquid droplets dripping downward bounce off at the cover unit of a chimney and then, under some circumstances, are deflected such that they can get into the adjacent chimney, in order to pass downward through the chimney tray through the passage orifice of this chimney. Such passage of liquid is supposed to be prevented.

With reference to FIG. 3, this problem with prior art chimney trays is elucidated once again:

In a column 1', a chimney tray 3' is secured to a column body 2'. The chimney tray 3' has at least two chimneys 5-1' and 5-2' arranged alongside one another. The first chimney 5-1' comprises a chimney body 6-2' which forms a passage orifice 7-1'. Spaced apart vertically from the chimney body 6-1', a cover unit 8-1' is arranged such that it covers the passage orifice 7-1' in the vertical direction. The second chimney 5-2' is formed in the same way. It has a chimney body 6-2' which forms a passage orifice 7-2'. Spaced apart vertically above it is arranged the cover unit 8-2'. Liquid droplets 10' dripping downward can then bounce off the cover unit 8-2' and be deflected there in the direction of the first chimney 5-1', such that they get through an orifice to the passage orifice 7-1' formed between the cover unit 8-1' and the chimney body 6-1'.

It is an object of the present invention to provide a chimney tray of the type specified at the outset and a column with such chimney tray, where liquid dripping downward is prevented from being able to pass through the chimney tray through a passage orifice of a chimney.

This object is achieved in accordance with the present invention. Advantageous configurations and developments are apparent from the dependent claims.

The chimney tray of the invention is characterized by a screen which extends around the chimney body of a first chimney, with the lower edge of the screen below the upper edge of the chimney body of the first chimney and the upper annular edge of the screen above the lower outer edge of the cover unit of the first chimney or adjoining the lower outer edge of the cover unit of the first chimney.

The screen of the chimney in the chimney tray of the invention prevents liquid droplets which do not just drip down from above but also bounce off an adjacent chimney or at the collecting tray of the chimney from being able to get to the passage orifice of this chimney.

The spatial terms "above", "below", "horizontal" and "vertical", unless explicitly mentioned otherwise, relate to the orientation of the chimney tray in a column during operation.

The chimney tray according to the invention does, in essence, not effect mass transfer between gas and liquid. It serves, in essence, for separating gas and liquid. The separation of gaseous and liquid streams accomplishes a controlled passage of the gas through the chimney tray.

The chimney tray according to the invention is therefore fundamentally different from mass transfer trays such as bubble cap trays. On bubble cap trays liquid is accumulated, e.g., by an overflow weir and the largest possible contact surface is provided between gas and liquid in order to accomplish extensive mass transfer between gas and liquid. This is reached by means of bell-shaped caps which prevent the gas rising through the passage orifices from escaping from the liquid in straight vertical direction. The lower edges of the caps (or the whole caps) plunge into the liquid all around the passage orifices such that the rising gas enters the liquid when passing under the lower edges of the caps.

Various configurations are conceivable for the cover unit. Each is intended to prevent the liquid droplets dripping down directly from above from being able to get into the passage orifice of the chimney. For this reason, the cover unit covers the passage orifice in the vertical direction. The screen is also fitted to the cover unit such that even liquid droplets that get to the chimney indirectly, which have been deflected, for example, on other surfaces of the column, cannot get into the passage orifice of the chimney.

The cover unit may, for example, be a covering hood, a bell-shaped cover or a covering roof. The cover unit is especially a conical roof with the tip pointing upward.

In one configuration of the chimney tray of the invention, between the chimney body, on the one hand, and the cover unit and the screen, on the other hand, a section for passing gas is provided. The section for passing gas is in this configuration free of installations.

Such installations hinder droplets that are entrained in the gas from leaving the area surrounding the chimney bodys. According to the invention, in the sections for passing gas are therefore preferably no installations such as knitted meshes or fabric mats. The gas passing through the tray therefore does not have to pass a knitted mesh or a fabric. The term installations also includes elements for directing liquid or gutters an the like which serve for directing liquid out of the area of the cover units or the screens. Preferably none of the surfaces of the chimney bodies, the cover units or the screens comprises a gutter, in particular no gutter for directing liquid through the chimney body into the area under the chimney tray.

When polymerizable fluid mixtures undergo thermal treatment, polymers are formed and solid polymers are deposited at or in such installations. These deposits would clog the knitted meshes or fabric mats already after short thermal treatment of the polymerizable fluid such that no more gas could pass through the tray. After some time, the gutters would not operate any more as they should because polymer deposits would hinder the intended flow of liquids in the gutter. Cleaning the gutters would require additional effort.

While the deposition of polymers at such sensitive installations affects the desired operation of the thermal treatment, the deposition of polymers on the surface or at the edges of chimney bodies, cover units and screens have much less influence on the operation of the thermal treatment. Only thick deposits that form after extended thermal treatment would then complicate thermal treatment to some extent. Abandonment of such installations thus accomplishes that the function of the chimney tray is compromised only when large amounts of polymer deposits have accumulated. This provides long periods of continuous operation of thermal treatment processes even when polymerizable liquid mixtures are treated.

In a further configuration at least one drain orifice is present in the collecting tray, through which liquid can be passed from the collecting tray into an area below the chimney tray.

This avoids collection of significant amounts of liquid on the collecting area of the chimney tray, i.e. on the upper side of the collecting tray.

The drain orifice or, if present, multiple drain orifices, preferably run into the inlet of a liquid draw which has an outlet in a region beneath the chimney tray. Preferably, from the drain orifice a drainpipe extends downward. The collecting tank in this case may take the form of a collecting cup disposed beneath the lower orifice of the drainpipe, the drainpipe passing through an area of the collecting cup which is formed by the upper edge of the collecting cup, and the upper edge of the collecting cup being disposed above the lower edge of the lower orifice of the drainpipe. The area formed by the upper edge of the collecting cup is just a theoretical area. It especially coincides with the liquid surface when the collecting cup is filled with liquid. Thus, when the collecting cup is filled with liquid, the drainpipe dips into the liquid present in the collecting cup, such that the hydraulic seal is provided in this way. This hydraulic seal prevents formation of a bypass for the ascending gas. The ascending gas cannot flow upward through the liquid draw past the orifices of the chimney tray.

In order that the liquid that collects on the collecting tray flows away via the drain orifice, the collecting tray may have a slope in the direction of drain orifice.

For example, it is also possible for a channel provided in the collecting area to have a slope and open into the drain orifice.

A chimney tray which is designed such that only minor amounts of liquid are collected on the collecting tray is universally applicable. It can be installed with particular advantage in columns that are intended for the thermal treatment of polymerizable liquid mixtures or for which such use shall not be excluded for the future.

In one configuration of the chimney tray of the invention, the cover unit is inclined downward from a center axis of the chimney body toward its outer annular edge which lies in the horizontal direction outside the passage orifice formed by the chimney body. This achieves the effect that liquid droplets dripping downward run off downward over the inclined surface of the cover unit to the collecting tray of the chimney tray.

The cylindrical, vertically aligned chimney bodies may have various cross-sectional geometries. For example, the chimney body may have a circular cross section. In another configuration, the chimney body has a rectangular, especially square, cross section. However, it would also be possible for the cross section to have elliptical or other round cross-sectional shapes or other angular cross-sectional shapes, for example an equilateral triangle. Advantageously, the cross section of the cover unit, in geometric terms, is the same as the cross section of the chimney body.

In a first working example of the chimney tray of the invention, the screen extends vertically downward from the lower edge of the cover unit of the first chimney to below the upper edge of the chimney body of the first chimney. In this case, the cover unit together with the screen thus has a one-piece configuration. This achieves particularly effective screening with respect to liquid droplets which are deflected laterally in the direction of the chimney. In this case, the vapor ascending upward passes through the passage orifice of the chimney through the chimney body to the cover unit. At that point, the cover unit and the screen deflect it downward again until it can get into the region above the chimney tray through the opening between the screen and the chimney body.

In this working example, the ratio of the height of the chimney body to the vertical distance of the upper edge of the chimney body from the lower edge of the screen is especially within a range from 10 to 30, preferably within a range from 10 to 15. This ratio is especially 12. This geometry achieves the effect that liquid droplets which bounce off the collecting tray of the chimney tray below and are deflected upward again cannot get into the passage orifice of the chimney.

In a further configuration, the ratio of the horizontal distance of the chimney body from the screen to the vertical distance of the upper edge of the chimney body from the lower edge of the screen is within a range from 1.0 to 1.5. Advantageously, this ratio is within a range from 1.1 to 1.3, and this ratio is preferably 1.2. This geometry of the chimney body with respect to the screen also prevents liquid droplets bouncing off below from being able to pass upward through the interspace between the screen and the chimney body through to the passage orifice of the chimney.

In a second working example of the chimney tray of the invention, the upper annular edge of the screen is above the lower edge of the cover unit of the first chimney and the screen is spaced apart horizontally from the cover unit. In this case, the cover unit and the screen thus have a two-part configuration. In this case, it is advantageously possible for vapor passing through from below to pass between the cover unit and the screen both in the upward and downward directions and to get into the region above the chimney tray. The vapor permeability of this chimney is thus improved. In addition, the vapor passes through various orifices into the region above the chimney tray. At the same time, the position of the screen relative to the cover unit and the chimney body is configured such that no liquid droplets can get into the passage orifice of the chimney.

In this working example, the ratio of the height of the chimney body to the vertical distance of the upper edge of the chimney body from the lower edge of the screen is especially within a range from 15 to 40, advantageously within a range from 20 to 30 and especially at a value of 22 or 28. This geometry of the chimney effectively prevents droplets which bounce off the collecting tray of the chimney tray below and are deflected upward from being able to get through the orifice between the chimney body and the screen through to the passage orifice of the chimney.

In addition, the ratio of the horizontal distance of the chimney body from the screen to the vertical distance of the upper edge of the chimney body from the lower edge of the screen is within a range from 2.0 to 4.0, preferably within a range from 2.5 to 3.4 and especially at a value of 2.6 or 3.2. This too effectively prevents liquid droplets deflected upward at the collecting tray from being able to get into the passage orifice of the chimney.

In a development of the second working example of the chimney tray of the invention, the upper annular edge of the screen is above the lower edge and below the highest point of the cover unit of the first chimney. This configuration achieves a compromise between an effective screen and a minimum extent of the screen, in order to assure very good passage of vapor.

In this case, the ratio of the horizontal distance of the highest point of the cover unit of the adjacent chimney, which is above the upper edge of the screen, to the vertical distance of the upper edge of the screen from the highest point of the cover unit of the adjacent chimney, which is above the upper edge of the screen, is within a range from 20 to 60, advantageously within a range from 40 to 50 and preferably at a value of 48.5. This effectively prevents, in the second working example, droplets which bounce off the cover unit of the adjacent chimney from being able to get to the passage orifice of the first chimney.

In a development of the first and second working examples of the chimney tray of the invention, the ratio of the cross-sectional area which is formed by the chimney body to the cross-sectional area which is formed between the screen and the chimney body is within a range from 0.5 to 10, especially within a range from 1 to 5. This prevents an excessively high pressure drop of the chimney tray and simultaneously backflow of liquid constituents from the upper part of the column through the chimney tray in all states of operation.

The column of the invention for thermal treatment of a fluid mixture comprises a cylindrical vertically aligned column body which forms a column cavity. A chimney tray of the invention is arranged in the column body.

The column body of the column preferably has at least one drain orifice which is arranged in the column body above the collecting tray or between an end face of the collecting tray and the column body. Liquid can be passed from the collecting tray through the drain orifice into an area below the chimney tray. This avoids collection of significant amounts of liquid on the collecting area of the chimney tray, i.e. on the upper side of the collecting tray, as described above.

The drain orifice is preferably arranged in the column body directly above the lowest part of the collecting area formed by the collecting tray.

The ratio of the vertical distance of the lowest part of the collecting area from the lower edge of the drain orifice to the vertical distance of the lowest part of the collecting area from the lower annular edge of the screen is, for example, within a range from 0 to 0.5, in particular within a range from 0 to 0.3, preferably within a range from 0 to 0.1.

A low arrangement of the drain orifice and, in particular of the lower edge of the drain orifice accomplishes a low level of the liquid on the chimney tray. The lower edge of the drain orifice is the lowest point of the drain orifice which must be overflown by the liquid that passes into the drain orifice.

Preferably, the drain orifice or the drain orifices are arranged so far down that the liquid collecting on the collecting area does only rise to a level that does not affect the passage of the gas when it passes the cover units and screens.

The drain orifice or, if present, multiple drain orifices, preferably run into the inlet of a liquid draw which has an outlet in a region beneath the chimney tray. Preferably, from the drain orifice a drainpipe extends downward. The liquid draw may especially comprise a pipe in siphon-like drainpipe. This drainpipe in siphon-like form provides a hydraulic seal for the ascending gas in a simple manner.

When polymerizable liquid mixtures are subjected to the thermal treatment it is advantageous not to collect any liquid on the collecting tray. It is particularly advantageous to avoid the collection of liquid on the collecting tray when the chimney tray of the invention is arranged in the lower part of a column where the temperature is so high that the undesired formation of dimers or higher oligomers is favored. The oligomerization is overall increased when a relatively large amount of liquid is exposed to high temperatures on the collecting tray. This is avoided by means of the drain orifice of the chimney trays and columns of the invention.

A working example of the chimney tray of the invention is illustrated hereinafter with reference to the drawings.

It is pointed out that the representations in FIGS. 1 to 5 are not to scale. They are intended to illustrate the geometry of the chimneys of the chimney trays and show the designations of the parts of the chimney tray. FIGS. 1 to 4 each show a partial view of a chimney tray mounted in a vertically aligned column body 2 of a column 1, especially a separation column. The chimney tray here may comprise a multitude of the chimneys shown, as shown, for example, in DE 101 59 825 A1.

Figure 1:
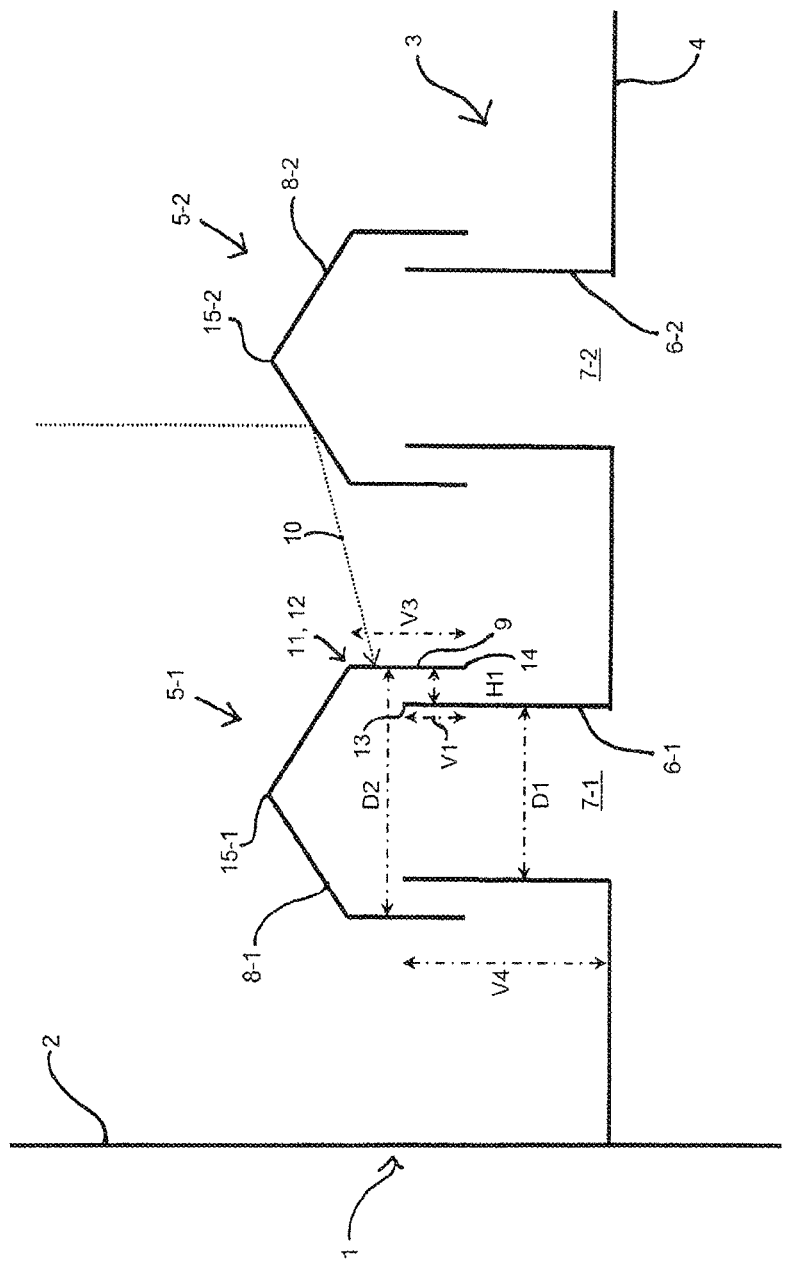
FIG. 1 shows a schematic of a partial view of the first working example of the chimney tray of the invention.

With reference to FIG. 1, a first working example of the chimney tray 3 of the invention is elucidated:

The chimney tray 3 is mounted horizontally in a vertically aligned column body 2 of a column 1. The chimney tray 3 comprises a collecting tray 4 on which the liquid trickling downward from above can collect. This liquid is led away via a downcomer (not shown) or an orifice in the column wall. The chimney tray 3 has a plurality of chimneys, of which two adjacent chimneys 5-1 and 5-2 are shown in FIG. 1. Each chimney comprises a cylindrical, vertically aligned chimney body 6-1 and 6-2, which form the passage orifices 7-1 and 7-2. The cross section line of the chimney body 6-1 and 6-2 is circular. However, the cross section line could also have another form, for example a rectangular form. The passage orifices 7-1 and 7-2 serve for passage of ascending vapor. Passage of liquid through these passage orifices 7-1 and 7-2 is to be prevented. Arranged above the chimney body 6-1 and 6-2 for this purpose are cover units 8-1 and 8-2 over the chimney bodies 6-1 and 6-2. The cover units 8-1 and 8-2 are spaced apart vertically from the chimney bodies 6-1 and 6-2, such that vapor ascending from below can get into the region above the chimney tray 3. In addition, the cover units 8-1 and 8-2 cover the passage orifices 7-1 and 7-2 in the vertical direction, in order to prevent liquid droplets dripping downward from being able to pass directly through the passage orifices 7-1 and 7-2. Chimneys of this kind are known per se.

At least one of the chimneys of the chimney tray 3 of the invention, in accordance with the invention, has a screen 9. Preferably, all the chimneys of the chimney tray 3 have this screen 9. However, the screen 9 is elucidated hereinafter only in relation to the chimney 5-1.

The cover unit 8-1 of the chimney 5-1 is a cone with its tip pointing upward, which forms a lower outer circular edge 12. The diameter D2 of this circular edge 12 is 980 mm. The chimney body 6-1 also has a circular cross section with a diameter D1 of 810 mm. The conical cover unit 8-1 is arranged over the middle of the chimney body 6-1. The center axis of the chimney body 6-1 thus cuts through the tip of the conical cover unit 8-1.

Between the chimney body 6-1, on the one hand, and the cover unit 8-1 and the screen 9, on the other hand, sections for passing gas are provided. Ascending gas or vapor passes these sections and then reaches the region above chimney tray 3. Each section for passing gas is free of installations.

In the first working example shown in FIG. 1, the screen 9 extends vertically downward from the lower edge 12 of the cover unit 8-1 to below the upper edge 13 of the chimney body 6-1. In this way, an annular, in the present case circular, cylindrical opening is formed between the lower portion of the screen 9 and the chimney 6-1, the horizontal distance H1 of the chimney body 6-1 from the screen 9 being 85 mm. The screen 9 thus forms a vertical ring which is concentric with respect to the chimney body 6-1.

In the case of use of the chimney tray 3 in a column 1 for thermal treatment of fluid mixtures, another important factor is the ratio of the cross-sectional area which is formed by the chimney body 6-1 to the cross-sectional area which is formed between the screen 9 and the chimney body 6-1, i.e. in the present case the cross-sectional area of the concentric ring. Gas flows into the chimney 5-1 through the cross-sectional area formed by the chimney body 6-1; gas flows out of the chimney 5-1 through the cross-sectional area formed between the screen 9 and the chimney body 6-1. This ratio is in the range from 0.5 to 10, preferably from 1 to 5. In the working example described, this ratio is 3. In this respect, FIG. 1 is not to scale. At higher ratios, the flow velocity become so high that it will be difficult for liquid droplets to move counter to the gas flow.

However, this then has the drawback that an excessively high pressure drop occurs in the chimney tray.

In addition, the vertical distance V1 of the upper edge 13 of the chimney body 6-1 from the lower edge 14 of the screen 9 is 70 mm. The vertical length V3 of the screen 9 is 300 mm and the height V4 of the chimney body 6-1 is 811 mm. This height is the vertical extent of the chimney body 6-1 above the collecting tray 4. It is optionally also possible for the chimney body to pass through the collecting tray 4 and extend further downward.

Particular geometric ratios of the screen 9 in relation to the further portions of the chimney 5-1 are of relevance for the efficacy of the screen 9 with respect to liquid droplets 10 which bounce off at the cover unit 8-2 of the adjacent chimney 5-2 in the direction of the chimney 5-1, and for any liquid droplets which are deflected upward from the collecting tray 4. In the working example shown in FIG. 1, the ratio V4/V1 of the height V4 of the chimney body 6-1 to the vertical distance V1 of the upper edge 13 of the chimney body 6-1 from the lower edge 14 of the screen 9 has a value of 12.

In addition, the ratio H1/V1 of the horizontal distance H1 of the chimney body 6-1 from the screen 9 to the vertical distance V1 of the upper edge 13 of the chimney body 6-1 from the lower edge 14 of the screen 9 has the value of 1.2.

Figure 2:
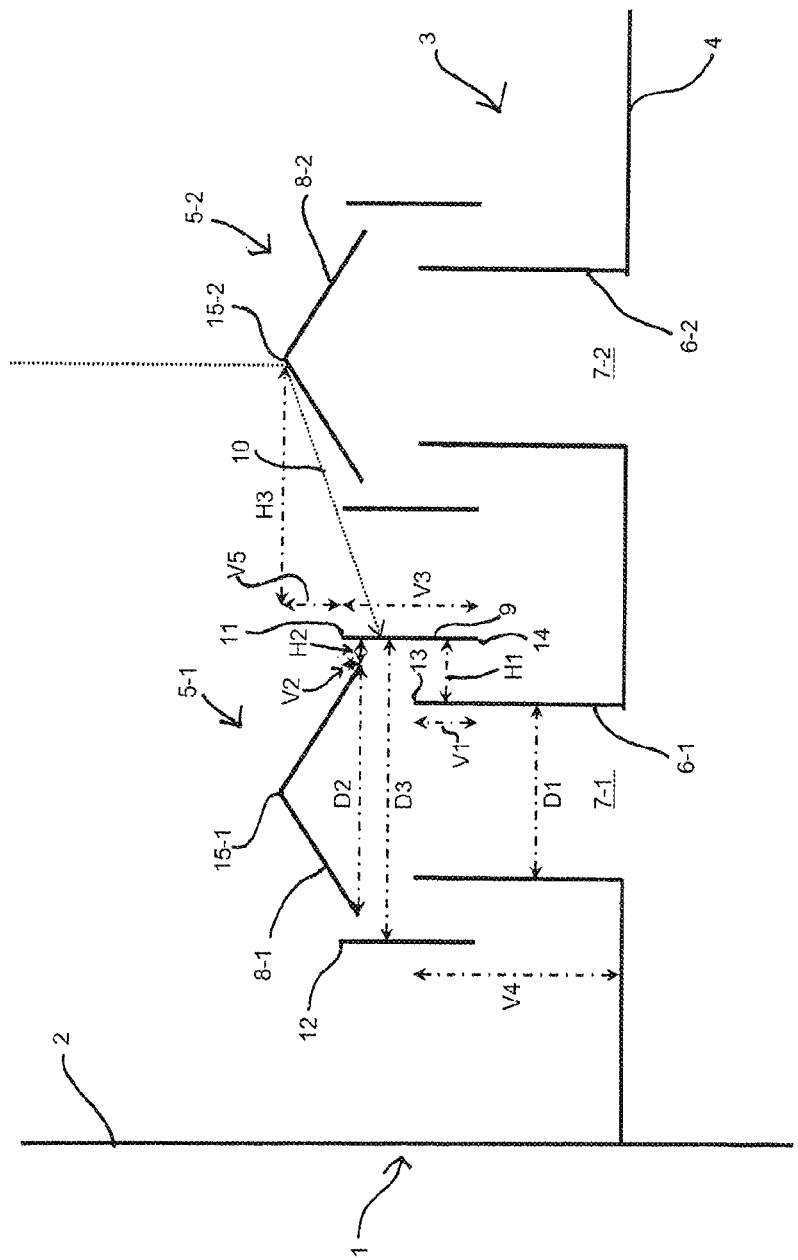
FIG. 2 shows a schematic of a partial view of the second working example of the chimney tray of the invention and FIG. 3 shows a schematic of a partial view of a known chimney tray.
Figure 3:
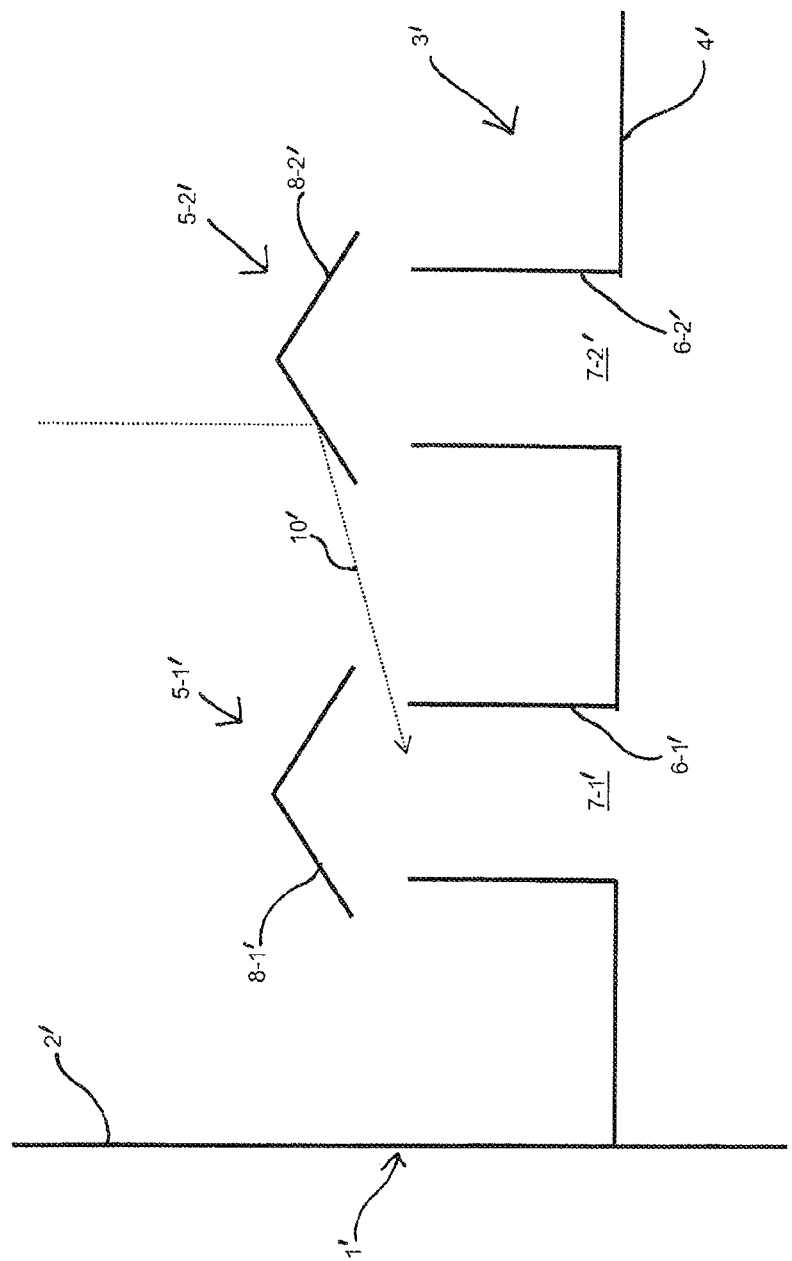

With reference to FIG. 2, a second working example of the chimney tray 3 of the invention is elucidated:

The chimney tray 3 of the second working example differs from the chimney tray 3 of the first working example shown in FIG. 1 in that the screen 9 is spaced apart horizontally from the cover unit 8-1. The chimneys 5-1 of the second working example are used especially when the pressure drop of the gas flowing through has to be minimized. In this embodiment, a somewhat smaller pressure drop is established, since the flow cross section of the gas flowing out of the chimneys 5-1 on the gas side is generally greater.

In this example, sections for passing gas are also provided between the chimney body, the cover unit and the screen. Each section for passing gas is free of installations.

In the second working example, the diameter D1 of the chimney body 6-1 is 740 mm and the diameter D2 at the lower edge 12 of the cover unit 8-1 is 915 mm. The diameter D3 of the screen 9 in this case is greater than the diameter D2 of the cover unit 8-1. It is 1200 mm. Both the cover unit 8-1 and the screen 9 are arranged centrally or concentrically with respect to the chimney body 6-1. The vertical ring of the screen 9 is thus arranged spaced apart in the horizontal direction both from the chimney body 6-1 and from the lower edge 12 of the cover unit 8-1. The horizontal distance H1 between the chimney body 6-1 and the screen 9 in this case is 230 mm. The horizontal distance H2 between the lower outer edge 12 of the cover unit 8-1 and the screen 9 is 87.5 mm.

The vertical distance V1 of the upper edge 13 of the chimney body 6-1 from the lower edge 14 of the screen 9 in this case is 90 mm. In addition, in the second working example, there is a vertical distance V2 of the lower outer edge 12 of the cover unit 8-1 from the upper edge 11 of the screen 9. This vertical distance V2 is 40 mm, with the upper edge 11 of the screen 9 arranged above the lower outer edge 11 of the cover unit 8-1. The vertical length V3 of the screen 9 in this case is 451 mm and the height V4 of the chimney body 6-1 is 1980 mm.

Since, in the second working example, an upper opening between the screen 9 and the cover unit 8-1 arises, the vertical length V5 of the highest point 15-2 of the adjacent chimney 5-2 from the upper edge 11 of the screen 9 is also of relevance in the second working example. In the second working example, the highest point 15-1 of the chimney 5-1 and the highest point 15-2 of the chimney 5-2 are arranged at the same height. When the upper edge 11 of the screen 9 extends as far as the highest point 15-2 of the adjacent chimney 5-2, this vertical length V5 is equal to 0. In the example shown in FIG. 2, however, the upper edge 11 of the screen 9 is only slightly higher than the lower edge 12 of the cover unit 8-1. In the second working example, the upper edge 11 of the screen 9, however, is supposed to reach as far as halfway between the highest point 15-1 of the chimney 5-1 and the lower edge 12 of the cover unit 8-1 of this chimney 5-1. The vertical length V5 in this case is 20 mm, since the highest points 15-1 and 15-2 in the two chimneys 5-1 and 5-2 are at the same height.

In addition, in this case, the horizontal distance H3 of the highest point 15-2 of the adjacent chimney 5-2, which is above the upper edge 11 of the screen 9 of the chimney 5-1, from the screen 9 of the chimney 5-1 is of relevance. This horizontal distance H3 in the second working example is 970 mm.

For effective screening of the passage orifice 7-1 of the chimney 5-1, particular geometric ratios of the screen 9 relative to the cover unit 8-1 and the chimney body 6-1 are of relevance.

In the second working example, the ratio V4/V1 of the height V4 of the chimney body 6-1 to the vertical distance V1 of the upper edge 13 of the chimney body 6-1 from the lower edge of the screen 9 has a value of 22.

Furthermore, the ratio H1/V1 of the horizontal distance H1 of the chimney body 6-1 from the screen 9 to the vertical distance V1 of the upper edge 13 of the chimney body 6-1 from the lower edge 14 of the screen 9 has a value of 2.6.

Moreover, the ratio H2/V2 of the horizontal distance of the lower edge 12 of the cover unit 8-1 from the screen 9 to the vertical distance V2 of the upper edge 11 of the screen 9 from the lower edge 12 of the cover unit 8-2 has a value of 2.2.

In addition, the ratio H3/V5 of the horizontal distance H3 of the highest point 15-2 of the cover unit 8-2 or the adjacent chimney 5-2, which is above the upper edge 11 of the screen 9, to the vertical distance V5 of the upper edge 11 of the screen 9 from the highest point 15-2 has a value of 48.5.

Finally, the ratio of the cross-sectional area which is formed by the chimney body 6-1 relative to the cross-sectional area which is formed between the screen 9 and the chimney body 6-1 is within a range from 0.5 to 10, preferably from 1 to 5. In the working example described, this ratio is 2. In this respect, FIG. 2 is not to scale. The ratio may be smaller than in the first working example, the the gas, in the case of the chimney 5-1 of the second working example, can also flow through an upper annular gap between the lower outer edge 12 of the cover unit 8-1 and the screen 9.

In one variant of the second working example, the diameter D1 is 850 mm, the diameter D2 is 1025 mm and the diameter D3 is 1300 mm. The vertical distance V1 in this case is 70 mm, the vertical distance V2 is 40 mm, the vertical length V3 of the screen 9 is 465 mm and the height V4 of the chimney body 8-1 is 1980 mm. The horizontal distance H1 in this case is 225 mm and the horizontal distance H2 is 87.5 mm. The ratio V4/V1 in this case is 28, the ratio H1/V1 in this case is 3.2 and the ratio H2/V2 in this case is 2.2.

Figure 4:
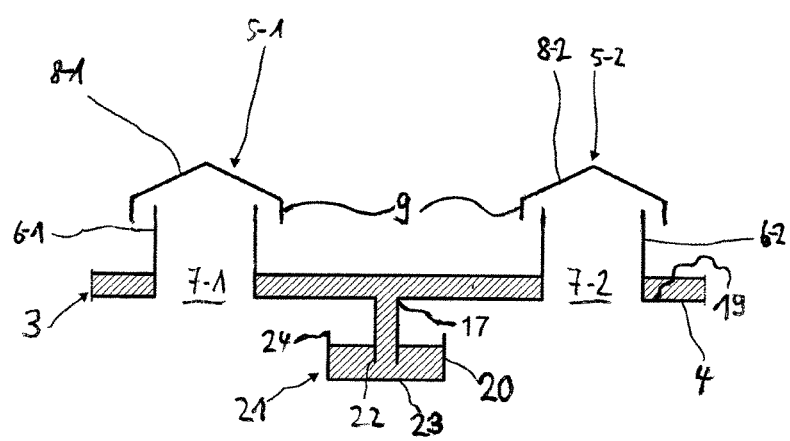
FIG. 4 shows a schematic of partial view of a chimney tray of the invention.

FIG. 4 shows a variant of chimney tray 3 according to the above working examples. The diameter of chimney tray is 7.4 m such that it can be installed horizontally in the column cavity at column body 2. Chimney tray 3 comprises twelve chimneys (only two are shown). The passage orifices 7-1, 7-2 of chimneys 5-1, 5-2 are circular and have a diameter of 810 mm. The proportion of the orifice area formed by the passage orifices relative to the inner cross-sectional area of the column is 14%.

Above the chimney bodies 6-1, 6-2, a cover unit 8-1, 8-2 is arranged vertically spaced-apart, which covers the respective passage orifice 7-1, 7-2. The upper annular edge of the screen 9 abjoins the lower outer edge of the respective cover unit 8-1, 8-2, as described with reference to the first working example. Screen 9 could alternatively be as described in the second working example.

In the middle of the chimney tray 3 is disposed a liquid draw 21. The liquid draw 21 comprises a circular orifice 17 from which a drainpipe extends downward. Through the drainpipe liquid which collects in the collecting area 19 of the chimney tray 3 can drain off downward. For this purpose, the collecting tray 4 may be inclined in the direction of the drain orifice 17. Beneath the drainpipe is a collecting cup 20 which forms a collecting tank for liquid. The lower edge 22 of the lower orifice of the drainpipe is spaced apart vertically from the base 23 of the collecting cup 20. In addition, the upper edge 24 of the collecting cup 20 is disposed above the lower edge 22 of the drainpipe. Liquid which flows downward through the drainpipe into the collecting cup 20 collects therein, such that the liquid level rises up to the upper edge 24 of the collecting cup 20. Thereafter, the liquid overflows out of the collecting cup 20 over the upper edge 24 and then passes into the area below the chimney tray 3. In this condition, the drainpipe dips into the liquid present in the collecting cup 20. The drainpipe thus passes through a theoretical area of the collecting cup 20 which is formed by the upper edge 24 of the collecting cup 20. In this way, a hydraulic seal is provided, which prevents gas ascending upward from being able to pass upward through the chimney tray 3 through the orifice of the drainpipe. It is thus possible to ensure that the gas rising upward only rises upward through the passage orifices 7-1, 7-2 of the chimneys 5-1, 5-2.

Figure 5:
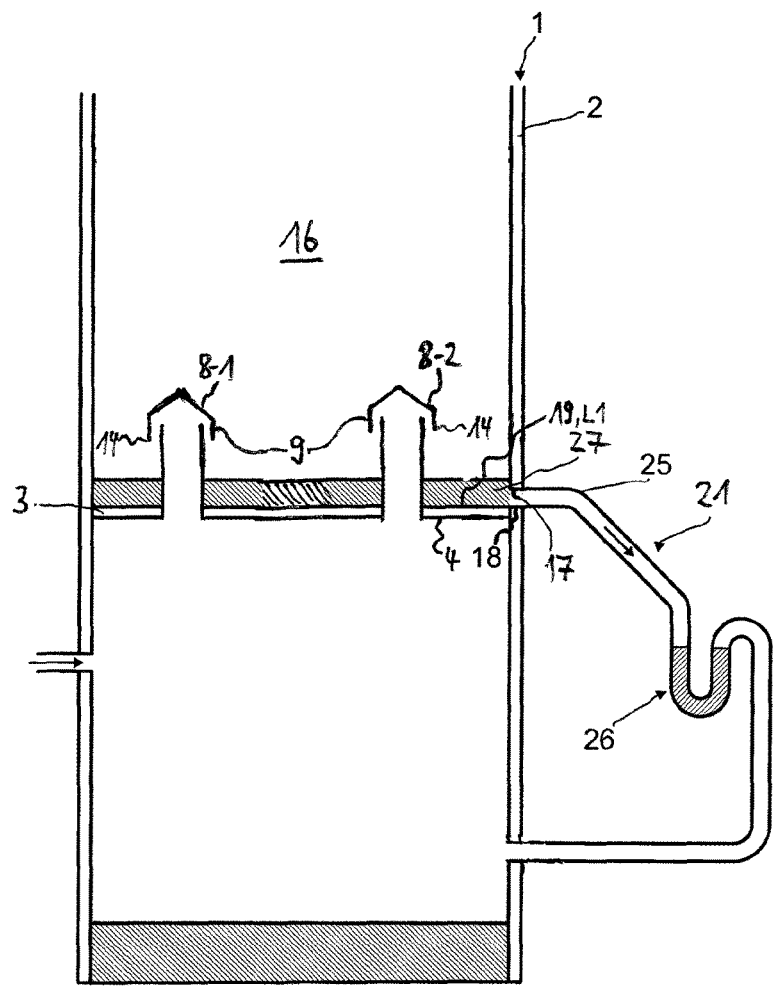
FIG. 5 shows a schematic of a cross-section of the lower part of a column of the invention.

FIG. 5 shows a schematic of another example of liquid draw 21 providing a hydraulic seal:

In this case chimney tray 3 does not have a liquid draw 21 in the middle. The liquid draw 21 is instead arranged in the column body 2. Therefore, the drain orifice 17 is arranged in the column body 2 directly above the collecting area 19 formed by the collecting tray 4. A tube 25 is connected to the drain orifice, which passes into a siphon-like drainpipe 26. The drainpipe then passes into the column cavity 16 below the chimney tray 3. Thus, liquid 27 which collects on the collecting area of chimney tray 3 can flow via liquid draw 21, for example, to the bottom of the column 1. The drain orifice is arrange so far down that the liquid cannot rise into the proximity of the lower edge 14 of the screen 9. The lower edge 18 of the drain orifice 17 is arranged on the level of the collecting area 19 (which has no slope). Accordingly, the drain orifice 17 is arranged such in the column body 2 that the ratio of the vertical distance of the lowest part of the collecting area 19 from the lower edge 18 of the drain orifice 17 to the vertical distance of the lowest part of the collecting area 19 from the lower annular edge 14 of the screen 9 is exactly 0. As the collecting tray has no slope, the whole collecting are 19 corresponds to the lowest part L1 of the collecting are 19.

LIST OF REFERENCE NUMERALS 1 column
2 column body
3 chimney tray
4 collecting tray
5-1, 5-2 chimneys
6-1, 6-2 chimney body
7-1, 7-2 passage orifices
8-1, 8-2 cover units
9 screen
10 liquid droplets
11 upper edge of the screen 9
12 lower edge of the cover unit 8-1
13 upper edge of the chimney body 6-1
14 lower edge of the screen 9
15-1, 15-2 highest points of the chimneys 5-1 and 5-2
16 column cavity
17 drain orifice
18 lower edge of the drain orifice 17
19 collecting area formed by the collecting tray 4
20 collecting cup
21 liquid draw
22 lower edge of the lower orifice of the drainpipe
23 base of the collecting cup 20
24 upper edge of the collecting cup 20
25 tube
26 siphon-like pipe
27 liquid
L1 lowest part of the collecting area 19

The invention claimed is:

1. A chimney tray for a column for thermal treatment of fluid mixtures, comprising:
   a collecting tray; and
   at least two chimneys spaced apart horizontally in the collecting tray, each chimney comprising:
      a vertically aligned chimney body which forms a passage orifice through the collecting tray; and
      a cover unit arranged spaced apart from the chimney body and covering the passage orifice in the vertical direction,
   wherein at least one chimney further comprises a screen which extends around the chimney body of the at least one chimney and which has a lower annular edge and an upper annular edge, and
   the chimney tray satisfies either condition (1) or condition (2):
   (1) the lower annular edge of the screen is positioned below an upper edge of the chimney body of the at least one chimney, and
   the upper annular edge of the screen is positioned above a lower edge of the cover unit of the at least one chimney, wherein the screen is spaced apart horizontally from the cover unit, wherein the ratio (V4/V1) of the height (V4) of the chimney body to the vertical distance (V1) of the upper edge of the chimney body from the lower edge of the screen is within a range from 15 to 40;
   (2) the upper annular edge of the screen adjoins the lower edge of the cover unit of the at least one chimney, wherein the screen extends vertically downward from the lower edge of the cover unit of the at least one chimney to a position below the upper edge of the chimney body of the at least one chimney, wherein the ratio (V4/V1) of the height (V4) of the chimney body to the vertical distance (V1) of the upper edge of the chimney body from the lower edge of the screen is within a range from 10 to 30.

2. The chimney tray according to claim 1, wherein between the chimney body, and the cover unit and the screen, a section for passing gas is provided, the section for passing gas being free of installations.

3. The chimney tray according to claim 1, wherein at least one drain orifice is present in the collecting tray, through which liquid can be passed from the collecting tray into an area below the chimney tray.

4. The chimney tray according to claim 1, wherein the cover unit has an outer annular edge which lies in the horizontal direction outside the passage orifice formed by the chimney body, and the cover unit is inclined downward from a center axis of the chimney body toward the outer annular edge of the cover unit.

5. The chimney tray according to claim 1, wherein the chimney body has a circular cross section.

6. The chimney tray according to claim 1, wherein the chimney body has a rectangular cross section.

7. The chimney tray according to claim 1, wherein, when the upper annular-edge of the screen adjoins the lower edge of the cover unit of the at least one chimney, the ratio (H1/V1) of the horizontal distance (H1) of the chimney body from the screen to the vertical distance (V1) of the upper edge of the chimney body from the lower edge of the screen is within a range from 1.0 to 1.5.

8. The chimney tray according to claim 1, wherein, when the upper annular edge of the screen is positioned above the lower edge of the cover unit of the at least one chimney, the ratio (H1/V1) of the horizontal distance (H1) of the chimney body from the screen to the vertical distance (V1) of the upper edge of the chimney body from the lower edge of the screen is within a range from 2.0 to 4.0.

9. The chimney tray according to claim 1, wherein, when the upper annular edge of the screen is positioned above the lower edge of the cover unit of the at least one chimney, the upper annular edge of the screen is positioned above the lower edge and below the highest point of the cover unit.

10. The chimney tray according to claim 1, wherein the ratio (H3/V5) of the horizontal distance (H3) of the screen from the highest point of the cover unit of an adjacent chimney, which is above the upper edge of the screen, to the vertical distance (V5) of the upper edge of the screen from the highest point of the cover unit of the adjacent chimney, which is above the upper edge of the screen, is within a range from 20 to 60.

11. The chimney tray according to claim 1, wherein the ratio of the cross-sectional area which is formed by the chimney body to the cross-sectional area which is formed between the screen and the chimney body is within a range from 0.5 to 10.

12. The chimney tray according to claim 1, wherein the ratio of the cross-sectional area which is formed by the chimney body to the cross-sectional area which is formed between the screen and the chimney body is within a range from 1 to 5.

13. A column for thermal treatment of a fluid mixture, comprising:
    a cylindrical vertically aligned column body which forms a column cavity; and
    a chimney tray according to claim 1 being arranged in the column body.

14. The column according to claim 13, wherein at least one drain orifice is arranged in the column body above the collecting tray or between an end face of the collecting tray and the column body, through which liquid can be passed from the collecting tray into an area below the chimney tray.

15. The column according to claim 14, wherein the at least one drain orifice is arranged in the column body directly above the lowest part (L1) of a collecting area formed by the collecting tray.

16. The column according to claim 14, wherein
    the ratio of the vertical distance of the lowest part (L1) of a collecting area from the lower edge of the at least one drain orifice to the vertical distance of the lowest part (L1) of the collecting area from the lower annular edge of the screen is within a range from 0 to 0.5.

* * * * *